MONITORING CIRCUIT FOR LINE UNIT SCANNED ON A TIME SHARED BASIS

Filed Nov. 2, 1966 3 Sheets-Sheet 1

INVENTOR
E. J. ARIDAS
BY R C Lipton
ATTORNEY

Jan. 27, 1970 E. J. ARIDAS 3,492,645

MONITORING CIRCUIT FOR LINE UNIT SCANNED ON A TIME SHARED BASIS

Filed Nov. 2, 1966 3 Sheets-Sheet 3

United States Patent Office 3,492,645
Patented Jan. 27, 1970

3,492,645

MONITORING CIRCUIT FOR LINE UNIT SCANNED ON A TIME SHARED BASIS

Efstratios J. Aridas, Oakhurst, N.J., assignor to Bell Telephone Laboratories, Incorporated, a corporation of New York Filed Nov. 2, 1966, Ser. No. 591,611
Int. Cl. G08c *15/12, 25/00*
U.S. Cl. 340—146.2 8 Claims

ABSTRACT OF THE DISCLOSURE

Outputs of line units, scanned on a time shared basis, are monitored by a pair of detectors, each providing a digital signal output having a weight corresponding to the number of signals concurrently applied to the output leads. The weighted outputs of the detectors are compared to determine comparison matches and mismatches. If a mismatch occurs, registers record the line unit address and the weighted signal condition of the line unit outputs.

Figure 1:
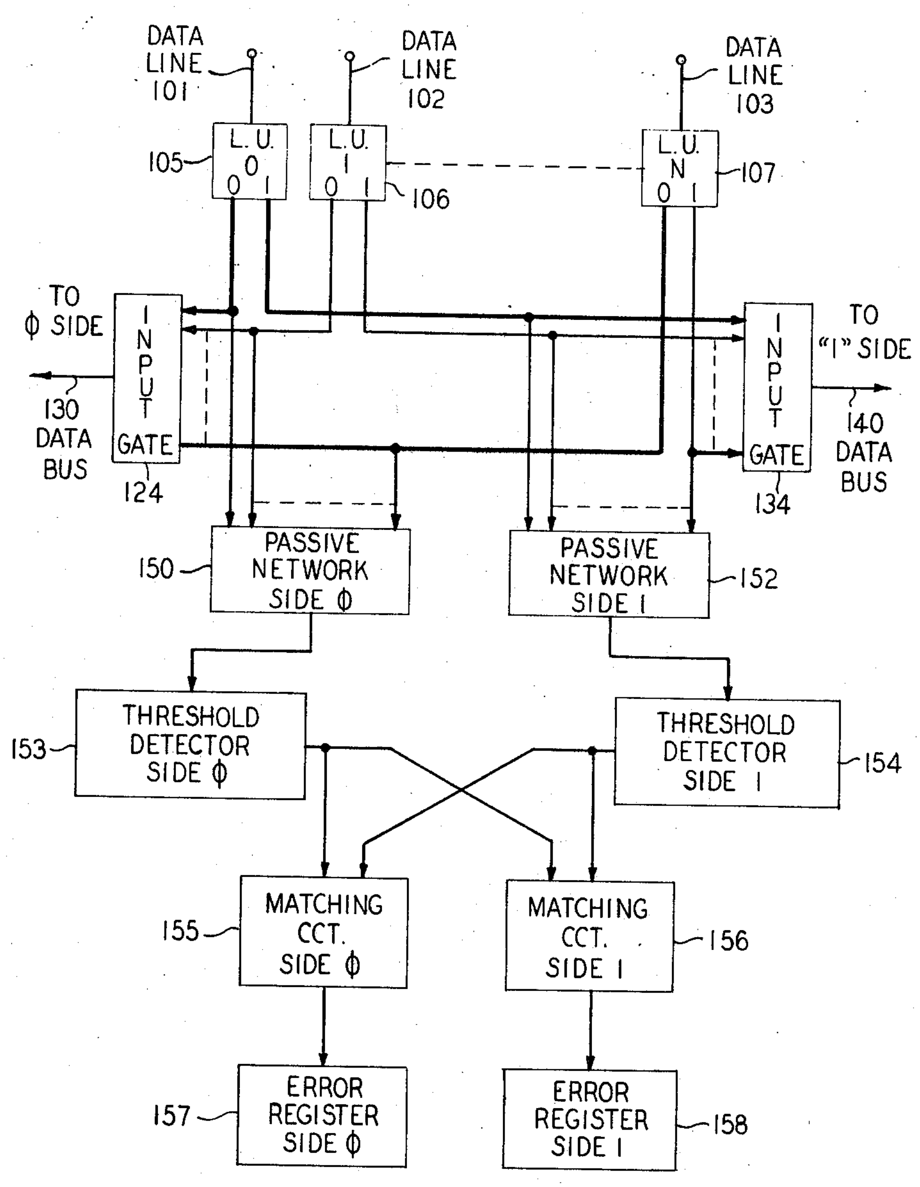

This invention relates to a monitoring circuit for data line units scanned on a time shared basis and, more particularly, to a matching circuit for comparing inputting from data lines to a data processor with the corresponding inputting from the data lines to a parallel data processor.

It is a broad object of this invention to check outputting of data line units scanned on a time shared basis.

It is another object of this invention to compare the inputting of data lines to a data processor with the corresponding inputting from the data lines to a parallel data processor.

The inputting for data switching or multiplex transmission systems is usually provided by a processing circuit which assembles data characters from the plurality of incoming lines on a bit by bit basis. One arrangement, disclosed in the copending application of R. C. Townley, Ser. No. 405,536, filed Oct. 21, 1964, provides a line scanner for sequentially addressing all incoming data line units to derive bit samples of the line signal and applying the samples, in parallel, to a common bus to obtain interleaved bits from all lines. The bits are then assembled for subsequent processing.

Although the data assembler equipment comprises but a small portion of the switching or transmission system, it is apparent that a failure of the proper operation of the assembler disables the entire system. To preclude a system failure, a standby assembler is provided with its own line units and sample bus in parallel with the prime assembler and arranged to be activated in the event of an abnormal operation of the prime equipment.

To identify an abnormal operation, circuits are provided to monitor the incoming line units and the outputs thereof, including the bits derived in response to the sequential scanner. The outputs and samplings may then be compared with the corresponding outputs and samplings obtained for the standby unit. Heretofore, monitor circuits are either connected, individually, to each line unit or a common monitor circuit is connected to the sample bus. Individual monitor circuits, however, dramatically increase the cost and complexity of the equipment. On the other hand, monitoring the bus presents problems in identifying a line unit in trouble, especially where failure involves open-circuited or short-circuited output leads which may contribute improper signals even when the line unit is not being sampled.

Accordingly, it is an object of this invention to detect, with common monitoring equipment, abnormal line unit operation during any portion of the scanning cycle.

It is another object of this invention to identify the line unit in trouble.

It is a further object of this invention to identify the type of line unit trouble.

In accordance with the illustrative embodiment of this invention disclosed herein, a detector, provided for each processor, is connected to all of the line unit output leads and is arranged to provide a plurality of digital signal outputs having a weight corresponding to the number of line unit output signals concurrently applied to the output leads. The weighted outputs of the detectors are then compared by checking circuits to determine comparison matches and mismatches. The checking circuits, in turn, control a pair of registers, each individual to a detector, to record the digital signal indicating the number of concurrent line unit signals when a mismatch occurs. In addition, the register is also arranged to record the address generated by the scanner of the line unit in trouble.

In the event that a detector indicates that two or more signal bits are concurrently applied to the line unit output leads connected thereto, it is assumed that one output lead of a unit not presently being addressed is short-circuited. In this case, the line unit in trouble can be identified when a match occurs since only that line unit is then providing an output signal. In accordance with a feature of this invention, the register is conditioned by the multiple weight signal of the detector to record the line unit address generated when a match occurs.

When a mismatch occurs and a detector indicates that no signal bits are applied to the line unit output leads connected thereto, it is assumed that that lead is open-circuited since a signal bit is concurrently being applied to the corresponding output lead connected to the other detector. In accordance with another feature of this invention, the register records the line unit address when a mismatch occurs and the detector indicates the lack of signal bits.

Figure 2:
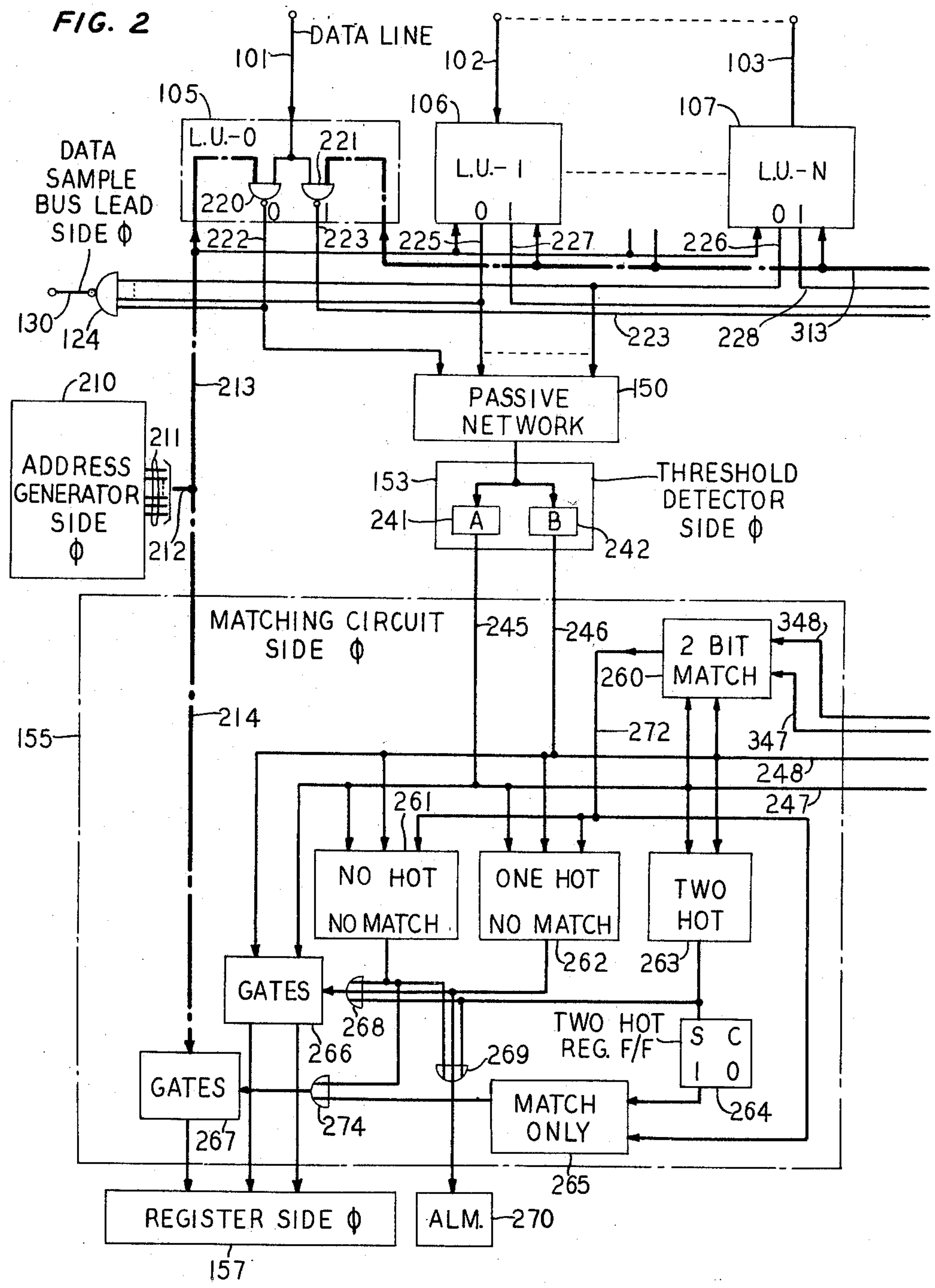
Figure 3:
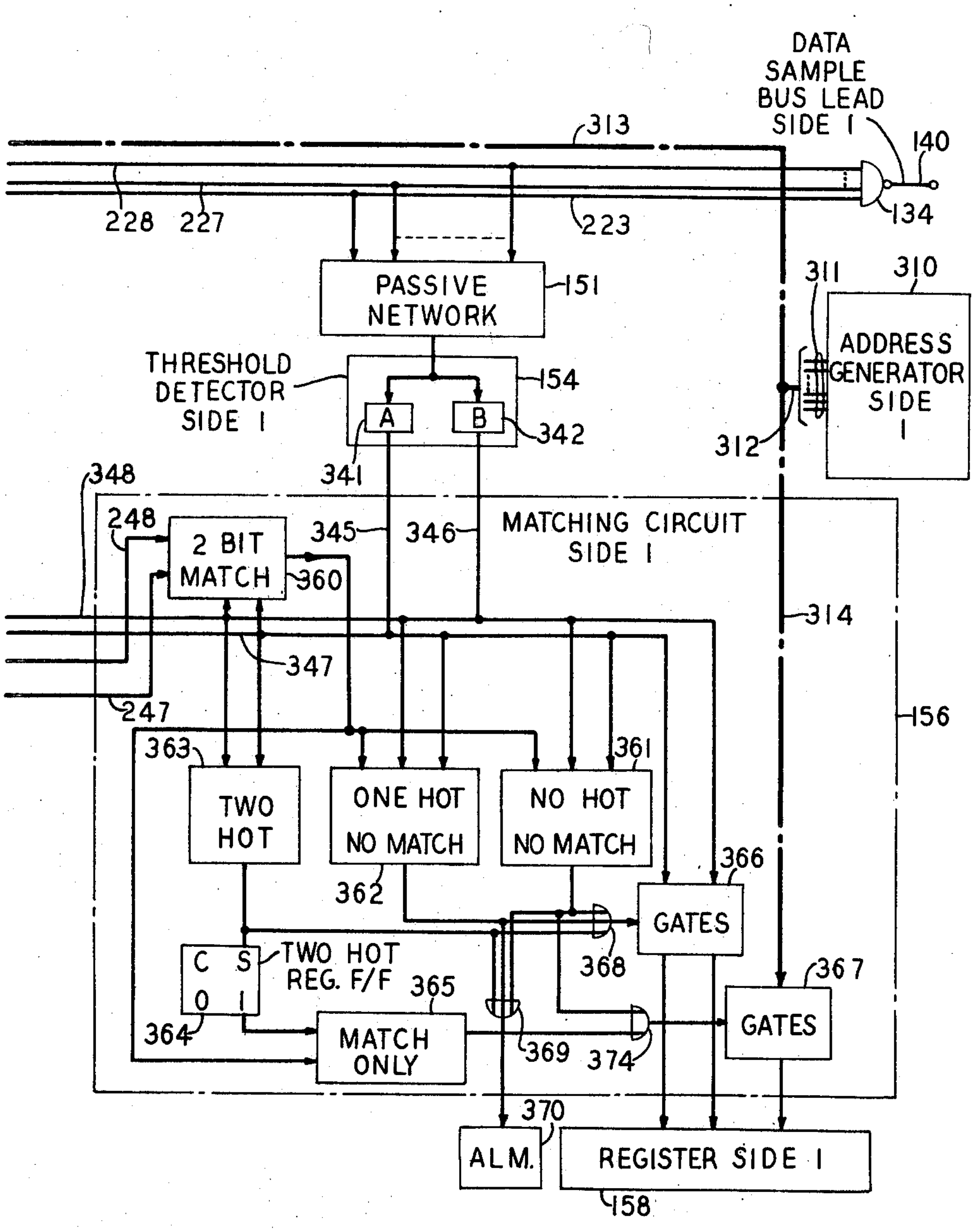

The foregoing and other objects and features of this invention will be more fully understood from the following description of an illustrative embodiment thereof taken in conjunction with the accompanying drawings wherein FIG. 1 shows in block schematic form, circuits and equipment of a monitoring system in accordance with this invention; and FIGS. 2 and 3, when aligned side by side, show the details of the circuits and equipment of the monitoring system.

Referring now to FIG. 1, a plurality of incoming data lines 101 through 103 terminate inline units generally indicated by blocks 105 through 107. As described in the above-identified application of R. C. Townley, any number of incoming data lines may be accommodated, such as, for example, 512, thereby requiring 512 associated line units. As further described in the application of R. C. Townley, an address generator sequentially enables the line units to scan the incoming data lines and line units 105 and 107, in turn, sequentially pass scanned data bits derived from associated data lines 101 through 103 to the output terminal "0" of the line unit and then to the input of a gate shown in FIG. 1 as block 124. Accordingly, the data bits sequentially scanned from data lines 101 through 103 are applied through input gate 124 to a sample lead, such as data bus 130. These sequential data bits are then assembled, as described in the application of R. C. Townley, for subsequent processing.

Where two companion processors in parallel are utilized, each includes its own address generator. Referring to FIG. 1, one processor, hereinafter referred to as the "0" side processor, addresses the line units, as previously described, and pass the line units, in response thereto sequentially scan the lines and the scanned bits through the "0" output terminals to data bus 130. The other processor on the "1" side concurrently and simultaneously addresses line units 105 through 107 and obtains corresponding data bits from the "1" output terminal of the line units. The scanned data bits are then passed to input gate 134 and thence to "1" side data bus 140. Accordingly, assuming the correct operation of the line units together with normal operation of the line unit output leads connected to the input gates 124 and 134, corresponding data bits are concurrently applied to the "0" side data bus 130 and the "1" side data bus 140.

In accordance with the present invention, the data bits applied by line units 105 through 107 to input gate 124 and the corresponding data bits applied to input gate 134 are checked to determine whether one line unit at a time is being scanned and whether the data bits applied to the input gates match. In accordance therewith, the line unit output leads extending to gate 124 are also connected to passive network 150 and the output of passive network 150 is connected to threshold detector 153. As described in detail hereinafter, passive network 150 provides a signal having an amplitude level corresponding to the number of data bits concurrently applied to the plurality of input leads connected to passive network 150. In other words, passive network 150 passes a signal having a first amplitude level to threshold detector 153 when none of the line unit output leads has a scanned bit applied thereto, passes a signal having an intermediate amplitude level when the plurality of lines have a single data bit applied thereto and passes a signal having a third level when two or more data bits are concurrently applied to the plurality of leads. In response to the three output levels of network 150, threshold detector 153 generates a digital signal, indicating the specific one of the three amplitude levels provided by passive network 150. It is noted that the latter condition comprising the third level invariably indicates an abnormal operation, such as a shorted line, since, as previously described, only one line unit is scanned at a time and the condition resulting from no data bits being applied to the leads when a data bit is received from an incoming data line indicates an open line.

The "1" side processor has associated thereto a corresponding passive network generator indicated by block 152 and a threshold detector indicated by block 154. Passive network 152 and threshold detector 154 operate in substantially the same manner as passive network 150 and threshold detector 153, checking in this instance the line unit output leads connected to gate 134.

The output of threshold detector 153 is passed to matching circuit 155. In addition, matching circuit 155 is connected to the output of threshold detector 154. As described hereinafter, matching circuit 155 determines whether the inputting to gate 124 is a normal operation and, in addition, whether the inputting to gate 124 matches the inputting to gate 134. In the event that threshold detector 153 detects bits being concurrently applied to two or more line unit output leads extending to the side "0" processor, indicating a line short, matching circuit 155 registers the abnormal operation, thereafter determines the address of the line unit in trouble and records the address in error register 157. In the event that the operation is normal but is mismatched with side "1" in that a data bit is applied to the output leads, an open line condition is assumed on the side which fails to scan the bit. Accordingly, an indication of this condition is registered and, in addition, the address of the line unit being addressed is recorded in register 157 in the event that the line units fail to apply a data bit to the line unit output leads on side "0."

Matching circuit 156, together with error register

158, operates in the same manner as matching circuit 155 and error register 157, checking in this instance the line unit output leads connected to gate 134. Accordingly, error registers 157 and 158 record the address of any line unit in trouble, indicating whether the line unit output lead extending to gate 124 or 134 is open or shorted.

Turning now to FIGS. 2 and 3, and especially to FIG. 2, the several line units indicate by blocks 105 through 107 in FIG. 1 are similarly designated in FIG. 2. Incoming data lines 101 through 103 are also shown in FIG. 2. In addition, gate 124 and side "0" data bus 130 are shown in FIG. 2, as is passive network 150, threshold detector 153, matching circuit 155 and register 157. Gate 134 and bus lead 140 of side "1," together with passive network 151, threshold detector 154, matching circuit 156 and register 158 are shown in FIG. 3.

Returning now to FIG. 2. The address generator of side "0," generally indicated by block 210, is shown, together with its plurality of output leads 211. These output leads extend by way of cable 212 to cable 213 and thence to line units 105 through 107. As described in the above-identified application of R. C. Townley, the permutation of signals applied by the address generator via its output leads enable each of line unit 105 through 107, and, more specifically, enable a gate in each line unit, such as gate 220, shown in FIG. 2.

Gate 220 is a well-known NAND gate which functions to provide a "0" bit at the output thereof only in the event that "1" bits are applied to all the input leads. Accordingly, in a normal condition address generator 210 applies a "1" bit to only one line unit. The gates in all other line units corresponding to gate 220, therefore, have "0" bits applied thereto, thereby passing "1" bits to the outputs thereof. Thus, when a line unit is not being addressed, a "1" bit is passed to the "0" output terminal thereof.

Considering now line unit 105 which is typical of the line units, in the event that this line unit is not being addressed by address generator 210, a "1" bit is passed to the "0" output of the line unit and then passed by way of lead 222 to input of gate 124 and concurrently to an input of passive network 150. In the event line unit 105 is being addressed and a "0" bit is being received on data line 101, gate 220 similarly produces a "1" bit at the output thereof, which "1" bit is similarly passed by way of lead 122 to gate 124 and to passive network 150. In the event, however, that a "1" bit is scanned on line 101 by line unit 105 when addressed, then all inputs to gate 220 provide "1" bits and the output of the gate provides a "0" bit which is passed via lead 222 to gate 124 and passive network 150. Therefore, when a "0" bit is scanned by an addressed line unit, that line unit, together with all unaddressed line units, produce "1" bits and, with all "1" bits being applied to gate 124, a "0" bit is passed to data bus 130. At the same time, all of the inputs to passive network 150 comprise "1" bits. Alternatively, when a "1" bit is scanned by addressed line unit one of output leads 222, 225 or 226 applies a "0" bit to gate 124, producing a "1" bit on data bus lead 130. At the same time, the one lead producing the "0" bit passes this bit to passive network 150 while all other leads from unscanned line units pass "1" bits to passive network 150. These above described operations occur during the normal operation of the "0" side processor.

In the event that one of the output leads of the line units extending to gate 124 and in parallel to passive network 150 is open-circuited, this lead will always present to gate 124 and passive network 150 a high impedance to the signal source. In the present embodiment this signal source is a low or negative potential whereby the simulated signal developed by the open-circuit lead is a relatively high potential or a "1" bit. Conversely, a short-circuited lead presents a low impedance to the signal source providing a low condition and thus simulating a "0" bit. As previously described, output leads 222, 225 and 226 normally produce a "0" bit on one lead and a "1" bit on all other leads when a "1" bit is scanned on an incoming data line and produce "1" bits on all of leads 222, 225 and 226 when a "0" bit is scanned on an incoming data line. An open-circuited output lead of a scanned line unit, however, always produces a "1" bit even though the line unit is scanning an incoming "1" bit on the data line and, conversely, a short-circuited line unit output lead always produces a "0" bit even though the line unit is not being addressed or the line unit is scanning a "0" bit on the incoming data line. This results in abnormal operation of the data processor.

Passive network 150 detects the number of line unit output leads carrying "0" bits, hereinafter referred to as hot lines. Passive network 150 may comprise, for example, a resistive matrix connected through parallel paths to the several line unit output leads. The output of passive network 150 is, therefore, in a high amplitude condition when all line unit output leads concurrently apply "1" bits thereto, assumes an intermediate condition when one of the line unit output leads is hot and drops below a minimum threshold amplitude when two or more leads are hot.

The three level conditions derived from the output of passive network 150 is passed to threshold detector 153. The threshold detector may advantageously include a pair of trigger circuit generators indicated by blocks 241 and 242.

Trigger circuit 241 may include input biasing means for firing the trigger circuit when the input signal amplitude drops below the previously described maximum level. Trigger circuit 252 may be biased to fire when the signal amplitude drops to the minimum level.

At the maximum signal output level of network 150, neither of triggers 241 and 242 has fired, thus providing "0" bits to the outputs thereof. A pair of "0" bits are, therefore, passed to leads 245 and 246 when passive network 150 recognizes that all of line unit output leads are in the "1" bit condition.

When the output of passive network 150 goes to the intermediate condition firing trigger 241, a "1" bit is applied to lead 245, the "0" bit remaining on lead 246, indicating that one of the line unit output leads is hot. With trigger 242 firing when passive network 150 produces the minimum signal level, "1" bits are applied to both leads 245 and 246 to designate that at least two hot leads concurrently exist among the line unit output leads, an abnormal operation, as previously described.

Leads 245 and 246 extend to side "0" matching circuit 155 and, in addition, through leads 247 and 248 to the corresponding match circuit 156 of side "1."

The address generator of side "1," generally indicated as block 310 in FIG. 3, addresses the line units via leads 311 and cables 312 and 313 concurrently with and in the same manner as address generator 210. Gates in each line unit, such as gate 221 in line unit 105, thus sequentially scan the incoming data lines passing the scanned bits through line unit output terminals "1" and leads 223, 227 and 228 to gate 134 and thence to side "1" data bus lead 140 in the same manner as the line unit output leads 222, 225 and 226 of the side "0" processor. Leads 223, 227 and 228 are also connected to passive network 151 which, in turn, is connected to side "1" threshold detector 154. Passive network 151 and threshold detector 154 operate in the same manner as network 150 and detector 153, whereby trigger circuits 341 and 342 in detector 154 apply digital signals to leads 345 and 346 in accordance with the three conditions of line unit output leads 223, 227 and 228 corresponding to the above described three conditions of line unit output leads 222, 225 and 226. Leads 345 and 346 extend to side "1" matching circuit 156 and, via leads 347 and 348, to side "0" matching circuit 155.

Considering in detail side "0" matching circuit 155, it is seen that leads 245 and 246 extend to inputs of two-bit match circuit 260, two-hot circuit 263, one-hot no-match circuit 262, no-hot no-match circuit 261 and gates 266. In addition to the above circuits, match circuit 155 also includes match only circuit 265, two-hot register flip-flop 264, gates 267 and OR gates 268, 269 and 274.

The other inputs to two-bit matching circuit 260 are connected to leads 347 and 348 and these latter leads extend by way of leads 345 and 346 to threshold detector 154 on side "1." As previously described, the signal bits applied by threshold detector 154 to leads 347 and 348 should match the signal bits applied to leads 247 and 248 by threshold detector 153, assuming normal operation of the line unit output leads extending to both the "0" side data processor and the "1" side data processor. Two-bit match circuit 260 functions to check whether these signal bits on leads 247 and 248 match the signal bits on leads 347 and 348. Two-bit match circuit 260 may comprise conventional AND gates which are normally connected together to provide a match signal to output lead 272 when the signals on lead pairs 247 and 248 check with lead pairs 347 and 348 and a no-match signal when the two pairs do not check.

Output lead 272 of two-bit match circuit 260 extends to inputs of match circuits 261, 262 and 265. No-hot no-match circuit 261 comprises a gate logic arrangement which produces a signal at the output thereof in the event that "0" bits are provided to both leads 245 and 246 and the no-match signal is passed to lead 272 by two-bit match circuit 260. The signal output of no-hot no-match circuit 261 provides an enabling signal through OR gate 268 to gates 266, provides an enabling signal through OR gate 274 to gates 267 and operates alarm 270 by way of OR gate 269. Thus, in the event that there is a mismatch with respect to side "1" and none of the line unit leads connected to passive network 150 is hot, gates 267 are enabled to pass the signal permutations on leads 211 produced by address generator 210 through cables 212 and 214 to register 157. Thus side "0" register 157 registers the address of the line unit being scanned when this mismatch occurs. In addition, the enabling of gates 266 passes the signal bits on leads 245 and 246 to register 157, registering the "0" bits on lines 245 and 246 to indicate that all of the line unit output leads on side "0" are applying "1" bits to passive network 150. An open circuit of the line unit output lead of the registered line unit address is thus indicated.

One-hot no-match circuit 262 detects a match failure when one of the line unit output leads on the "0" side has a "0" bit applied thereto. With respect to the leads on the "0" side, this may be a condition wherein the one lead supplying the "0" bit is shorted or a condition where the corresponding output lead on the "1" side is open-circuited. Since this does not necessarily indicate that the line unit on the "0" side is in trouble, the address is not registered on side "0."

Considering now the operation of one-hot no-match circuit 262, the application of a "1" bit to lead 245 and a "0" bit to lead 246, together with a no-match signal on lead 272, enables circuit 262. One-hot no-match circuit 262 is a gate logic circuit arranged to provide an enabling signal at the output thereof in response to the above described signals. This enabling signal passes through OR gate 268 to enable gates 266 and through OR gate 269 to energize alarm 270. Accordingly, alarm 270 is energized and gates 266 record the bits on leads 245 and 246 in register 257. Thus, in response to a one-hot condition on the "0" side, together with a match failure, the alarm is energized and the one-hot condition is recorded in register 157.

Two-hot circuit 263 functions to detect the occurrence of two simultaneous hot leads on the "0" side. As previously described, leads 245 and 246 extend to the input of two-hot circuit 263 and this latter circuit comprises a logic arrangement which, in response to "1" bits on both leads, provides an enabling signal at the output thereof.

The output of two-hot circuit 263 extends to OR gates 268 and 269 and, in addition thereto, to the set input of two-hot register flip-flop 264. Accordingly, upon the simultaneous application of "0" bits to two line unit output leads on the "0" side, two-hot circuit 263 operates gates 266 via OR gate 268 and alarm 270 by way of OR gate 269. Thus, the alarm is energized and the double "1" bits on leads 245 and 246 are registered in register 157. In addition register flip-flop 264 is set, providing an enabling signal from the "1" output terminal thereof to condition match circuit 265.

With each subsequent double hot condition of the line unit output leads on the "0" side indicating that an output lead has been shorted, the signal bits on leads 245 and 246 are recorded in register 157 in the same manner as previously described. In addition, when the line unit in trouble is addressed and scans a "0" bit on the incoming data line, one lead is hot on the "0" side, no leads are hot on the "1" side, there is a match failure and one-hot no-match circuit 262 applies the signal bits on leads 245 and 246 to register 257 as previously described. When the line unit in trouble is addressed, however, and scans a "1" bit, one lead on each of sides "0" and "1" are hot and a match thus occurs. This match is detected by match circuit 260 and the enabling signal at the output thereof is passed by way of lead 272 to match-only circuit 265. Match-only circuit 265, being previously conditioned by register flip-flop 264, is arranged to enable gates 267 via OR gate 274. Accordingly, the address of the line unit in trouble is recorded in register 157. Register 157 may be subsequently cleared in any well-known manner and register flip-flop 264 may be concurrently cleared to remove the registered conditioning of match-only circuit 265.

Summarizing the operation of matching circuit 155, when a mismatch occurs and none of the line output leads on the "0" side that are connected to passive network 150 is hot, "0" bits are applied to leads 245 and 246 and a no-match signal is applied to lead 272 by two-bit match circuit 260. This enables no-hot no-match circuit 261, which operates alarm 270, enables gates 267 to record in register 157 the line unit being addressed and enables gates 266 to register the conditions of leads 245 and 246, indicating that all of the line unit output leads are applying "1" bits to side "0." The registration of the address in register 157, together with the bit conditions of leads 245 and 246, indicates an abnormal operation of the line unit such as an open-circuited output line extending to side "0" since side "1" has had applied to the output leads a "0" bit while side "0" has failed to receive the "0" bit.

When a mismatch occurs and one of the line output leads on the "0" side is hot, a "1" bit is applied to lead 245 and a no-match signal is applied to lead 272 by two-bit match circuit 260. This enables one-hot no-match circuit 262 which operates alarm 270 and enables gates 266 to register the conditions of leads 245 and 246 in register 157, thus indicating that one of the line unit output leads is applying a "0" bit to side "0." The registration of the bit conditions of leads 245 and 246 indicates an abnormal operation. However, since the output leads extending to side "0" have had applied thereto a "0" bit, it is presumed that the failure occurs on the other side and the line unit address is not recorded.

When two or more of the unit line output leads on the "0" side are hot, "1" bits are applied to leads 245 and 246 and two-hot circuit 263 operates register flip-flop 264, which, in turn, conditions match-only circuit 265. In addition, two-hot circuit 263 energizes alarm 270 and operates gates 266 to register the conditions of leads 245 and 246 in register 157, indicating a double hot condition on the "0" side. When a subsequent match occurs, indicating that the line unit in trouble has been addressed, two-bit match-circuit 260 operates the conditioned match-only circuit 265 to enable gates 267, whereby the address of the line unit in trouble is recorded in register 157.

Accordingly, register 157 records the indications of an abnormal operation and, where this operation occurs on the "0" side, the address of the line unit in trouble and the particular outputting condition of this line unit.

Match circuit 156, together with register 158 and alarm 370, are arranged to provide substantially the same function for the line unit output leads on the "1" side as provided by match circuit 155, register 157 and alarm 270 on the "0" side. Thus, abnormal operations are registered in register 158, together with the address of any line unit in trouble where the abnormal operation involves the line unit output lead on the "1" side.

Although a specific embodiment of this invention has been shown and described, it will be understood that various modifications may be made without departing from the spirit of this invention.

What is claimed is:

1. In a time shared data signaling system, a plurality of incoming data lines conveying data signals, address generating means, a pair of sampling circuits for each of said lines for concurrently providing bits sampled from said data signals on said line to each of the outputs thereof when addressed by said address generating means, a pair of detector circuits, each of said circuits for examining the outputs of corresponding ones of said sampling circuits in each of said pairs and providing in response thereto a selected one of at least three output signals indicating the number of sampled bits concurrently applied to all of said corresponding outputs, and means for comparing the output indications of said detectors to designate comparison matches and mismatches.

2. In a time shared data signaling system in accordance with claim 1 including recording means responsive to said comparing means for recording the sampling circuit address generated by said address generating means.

3. In a time shared data signaling system in accordance with claim 2 wherein said recording means further records said indications of the number of sampled bits concurrently applied to said corresponding outputs.

4. In a time shared data signaling system in accordance with claim 2 wherein said recording means comprises a pair of registers each associated with one of said detectors and individually arranged to record said addresses of said corresponding ones of said sampling circuits.

5. In a time shared data signaling system in accordance with claim 4, wherein said comparing means includes further means responsive to an output indication of said detector of the concurrent application of a plurality of sampled bits to said corresponding outputs for conditioning said associated register and means thereafter responsive to a comparison match for operating said conditioned register.

6. In a time shared data signaling system in accordance with claim 5, wherein said responsive further means enables said associated register to record said output indications of said detector.

7. In a time shared data signaling system in accordance with claim 4, wherein each of said registers is operated upon the designation of a comparison mismatch to record output indications of the associated detector.

8. In a time shared data signaling system in accordance with claim 4 wherein each of said registers is operated upon the designation of a comparison mismatch to record said sampling circuit address when said associated detector indicates that no sampled bits are applied to said corresponding outputs.

(References on following page)

References Cited

UNITED STATES PATENTS 3,143,960 5/1964 Mazziotti -------- 235—177 X
3,340,506 9/1967 Mayer --------- 340—146.2 X MALCOLM A. MORRISON, Primary Examiner
R. STEPHEN DILDINE, Assistant Examiner U.S. Cl. X.R.

235—153; 340—146.1